3,183,666
METHOD OF GASIFYING A LIQUID GAS WHILE PRODUCING MECHANICAL ENERGY
Robert Glover Jackson, Hornchurch, England, assignor to Conch International Methane Limited, Nassau, Bahamas, a Bahamian company
Filed Feb. 28, 1963, Ser. No. 261,587
Claims priority, application Great Britain, May 2, 1962, 16,869/62
7 Claims. (Cl. 60—38)

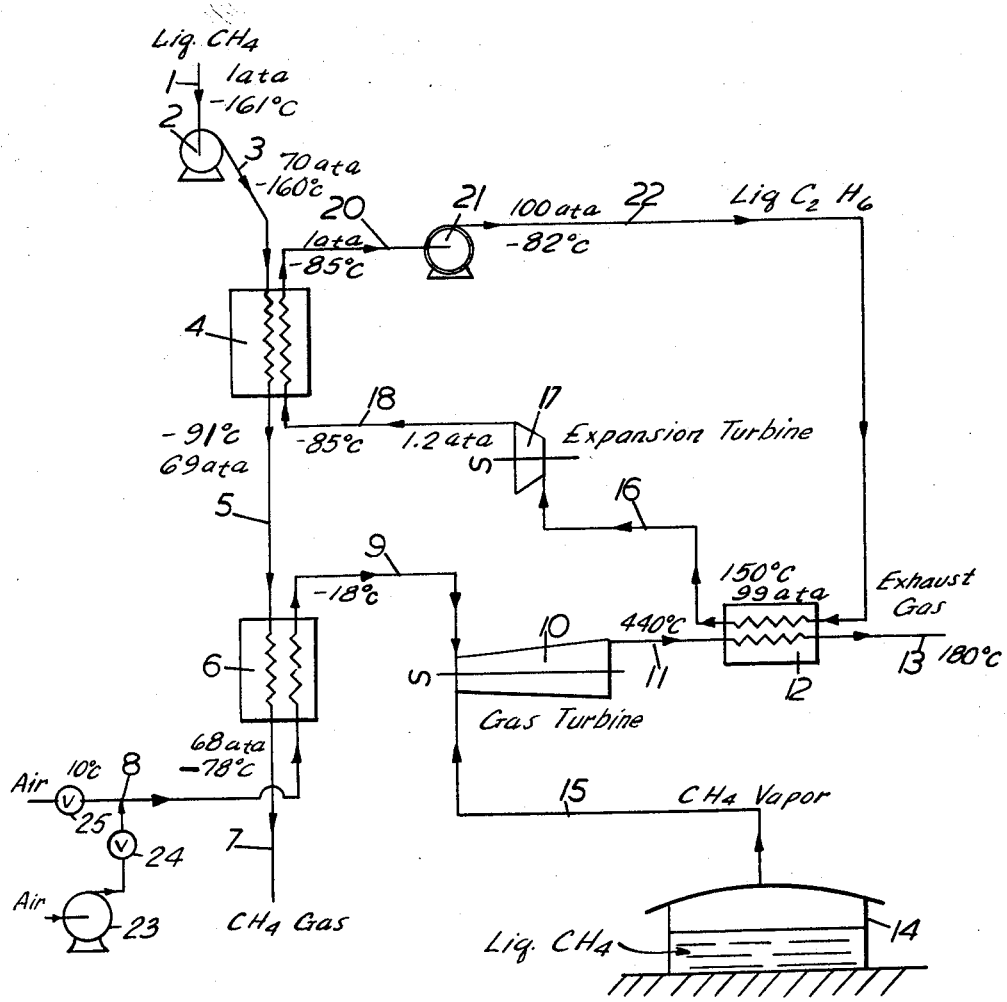

This invention relates to a method of gasifying a liquefied gas while producing mechanical energy.

In order to enable economical transport of gases, said gases are sometimes liquefied and transported in liquefied condition in heat insulated containers. In the consumption area said liquefied gases are then gasified again and used for various purposes.

During the regasification of liquefied gases often large amounts of cold are liberated and it will be clear that it is desirable to prevent the wastage of this cold.

This can be done by making use of it for the production of energy. Or in other words use can be made of the temperature difference between the liquefied gas and some suitable heat source for the production of mechanical energy.

It is an object of the invention to provide a new process of this kind so that a maximum amount of mechanical energy can be obtained from the gasification of the liquefied gas.

The method according to the invention comprises the steps of passing the liquefied gas in indirect heat exchange with the exhaust gases of an internal combustion engine and then in indirect heat exchange with air to be fed into said internal combustion engine, so that the liquefied gas is gasified.

The exhaust gases from the internal combustion engine are preferably passed in indirect heat exchange with a heat transfer medium which circulates in a closed cycle and which is passed in indirect heat exchange with the liquefied gas which is to be gasified.

The process according to the invention is mainly destined for the gasification of liquefied methane, liquefied natural gas, liquefied ethane or liquefied propane, but it will be clear that it can also be used for the gasification of other gases such as liquefied nitrogen or liquefied oxygen.

The invention will be explained with reference to the drawing which shows schematically an arrangement of apparatus necessary for the method according to the invention.

A liquefied gas to be gasified is supplied through a line 1 to a pump 2 in which the pressure of the liquefied gas is raised. From pump 2 the liquefied gas is passed through a line 3 to a heat exchanger 4 in which heat is supplied to the liquefied gas which is to be gasified. This heat is obtained from the exhaust gases of a gas turbine 10 as will be explained later.

From heat exchanger 4 the material flows through line 5 to a heat exchanger 6 in which more heat is supplied. Only gaseous material leaves the heat exchanger 6 through line 7.

Heat is supplied to heat exchanger 6 by supplying air to it through a line 8. Said air which is about ambient temperature is cooled down in heat-exchanger 6 and passes through a line 9 to a gas turbine 10 in which the air is used for combustion. Fuel is supplied to the gas turbine 10 through a line 15. The combustion products formed leave the internal combustion engine 10 in the form of exhaust gases having a relatively high temperature. The relatively hot exhaust gases are passed through a line 11 to a heat exchanger 12 and are cooled down in heat exchanger 12. The exhaust gases leave heat-exchanger 12 and are passed to the atmosphere through a line 13.

Heat from the hot exhaust gases passing through heat exchanger 12 is transformed to a heat-transfer medium which is in liquid condition and at elevated pressure and which is passed through heat exchanger 12. This heat-transfer causes the gasification of said heat transfer medium, so it leaves heat-exchanger 12 as a gas of elevated pressure. This gas is passed through a line 16 to an expansion turbine 17 in which it is expanded to a lower pressure. The expansion turbine 17 produces mechanical energy. The gaseous heat-transfer medium leaving turbine 17 is passed through a line 18 to heat-exchanger 4. In heat-exchanger 4 the gaseous heat-transfer medium is condensed and heat is transferred from it to the liquefied gas which is to be gasified. The condensed heat transfer medium leaves heat-exchanger 4 and is passed through a line 20 to a pump 21 in which the pressure of the heat transfer medium is raised to an elevated pressure. From pump 21 the heat-transfer medium which is in liquid condition and at elevated pressure is passed through line 22 to heat exchanger 12.

As already mentioned the inlet air to the gas turbine 10 is cooled down in heat exchanger 6. By cooling said inlet air in the way as indicated there is the advantage that per unit mass of gas passing through the gas turbine 10 more mechanical energy can be obtained. Or in other words by cooling the inlet air mechanical energy can be produced by a smaller gas turbine than a gas turbine producing the same amount of mechanical energy which uses inlet air which is not precooled.

A suitable heat transfer medium for use in the closed cycle 16, 17, 18, 4, 20, 21, 22, 12 is for example ethane.

A suitable fuel for the gas turbine is for example boil-off gas from liquefied natural gas or liquefied methane stored in a tank 14. This boil-off gas is passed from tank 14 through line 15 to gas turbine 10. It is however possible to use other fuels, if desired.

In the method as described mechanical energy is produced both by the gas turbine 10 and by the turbine 17. If desired this mechanical energy can be converted into electrical energy.

In the following a numerical example will be given of the gasification of liquefied methane by means of the method according to the invention.

Liquefied methane at a pressure of 1 atmosphere absolute (hereinafter "ata.") and at a temperature of minus 161 degrees centigrade is supplied through line 1 to the pump 2. The quantity of liquefied methane supplieds is 3750 lb./min. In pump 2 the pressure is raised to 70 ata. and the temperature to minus 160 degrees centigrade. The liquefied methane is then passed through heat exchanger 4 so that its temperature is raised to minus 91 degrees centigrade. In the heat exchanger 4 a slight pressure drop will occur so that the liquefied methane leaves the heat exchanger 4 at a pressure of 69 ata. The liquefied methane is then passed through line 5 to heat-exchanger 6 in which the methane is gasified. The gaseous methane leaves heat exchanger 6 at a pressure of 68 ata. and at a temperature of minus 78 degrees centigrade. The gaseous methane is then passed through line 7. If desired it can be further heated to ambient temperature.

Ambient air of plus 10 degrees centigrade is passed through line 8 to heat exchanger 6. The quantity of air is 7000 lb./min. In heat exchanger 6 the air is cooled down to minus 18 degrees centigrade and then it is passed through line 9 to gas turbine 10 wherein it is used for the combustion of the fuel supplied to the turbine.

The fuel is boil-off gas that is gaseous methane from liquefied methane stored in a tank 14 and passed to the gas turbine 10 through line 15. The quantity supplied to the gas turbine 10 is 60 lb./min.

Exhaust gases leave the gas turbine 10 at a temperature of plus 440 degrees centigrade. The exhaust gases are passed through line 11 to heat exchanger 12 in which they are cooled down to plus 180 degrees centigrade.

Liquid ethane of minus 82 degrees centigrade and at a pressure of 100 ata. passes through heat-exchanger 12. The quantity of ethane circulating is 2250 lb./min. In heat-exchanger 12 the ethane is gasified so that ethane gas of plus 150 degrees centigrade and at a pressure of 99 ata. leaves heat-exchanger 12. This gas is passed through line 16 to expansion turbine 17 in which it is expanded to a pressure of 1.2 ata. so that it cools down to minus 85 degrees centigrade. Then the gaseous ethane is passed through line 18 to heat-exchanger 4 in which it condenses. Liquid ethane at a pressure of 1 ata. and at a temperature of minue 85 degrees centigrade leaves heat-exchanger 4 and this liquid is passed through line 20 to pump 21 in which its pressure is raised to 100 ata. and its temperature to minus 82 degrees centigrade.

If the gas turbine 10 and the expansion turbine 17 are each connected to an electricity generator and the efficiencies of the turbines and of the generators are taken into account the electrical energy produced by the gas turbine 10 will be about 7,000 kilowatt and the electrical energy produced by the expansion turbine 17 will be 4000 kilowatt.

The energy consumed by the pump 2 is 650 kilowatt and the energy consumed by pump 21 is 440 kilowatt.

Thus the net amount of enegry which can be obtained is about 10,000 kilowatt.

It will be clear that the above example has not been given to limit the scope of the protection claimed to this example.

Instead of the gas turbine 10 another type of internal combustion engine for example a reciprocating piston engine can be used, although the use of a gas turbine is more advantageous in most cases.

The air fed into the engine 10 can be recompressed if desired, for which purpose a pump 23 and throttle valve 24 are provided, valve 25 being shut off and valve 24 opened when precompression is employed.

Furthermore the liquefied gas leaving the first heat-exchanger 4 can be further raised in pressure before it is passed through heat-exchanger 6. Instead it is however also possible to expand the gas somewhat after it has left heat-exchanger 4.

I claim:

1. A method of gasifying a liquefied gas while producing mechanical energy which comprises passing the liquefied gas in indirect heat exchange with a heat transfer medium which circulates in a closed cycle and which medium is passed in indirect heat exchange with the exhaust gases from an internal combustion engine, and thereafter passing said liquefied gas in indirect heat exchange with air to be fed into said internal combustion engine, whereby the liquefied gas is gasified.

2. A method as claimed in claim 1 which comprises passing the heat transfer medium in liquid condition and at elevated pressure in indirect heat exchange with the exhaust gas of the internal combustion engine so that the heat transfer medium is converted into a gas of elevated pressure, passing the gaseous heat transfer medium through an expansion device so that mechanical energy is produced, passing the expanded gaseous heat transfer medium in indirect heat exchange with the liquefied gas which is to be gasified so that the gaseous heat transfer medium is condensed and raising the pressure of the condensed heat transfer medium to said elevated pressure.

3. A method as claimed in claim 1 in which the heat transfer medium is ethane.

4. A method as claimed in claim 2 in which the expansion device through which the heat transfer medium is passed is a turbine.

5. A method as claimed in claim 1 in which the liquefied gas to be gasified comprises methane.

6. A method as claimed in claim 2 in which the internal combustion engine is a gas turbine and in which the fuel fed into the gas turbine is boil-off from a tank containing liquefied gas comprising methane.

7. A method as claimed in claim 6 in which the air is fed into the gas turbine at elevated pressure.

References Cited by the Examiner

UNITED STATES PATENTS

| | | | |
|---|---|---|---|
| 2,937,504 | 5/60 | Riediger | 62—53 |
| 3,018,634 | 1/62 | Gilmore | 62—52 |
| 3,068,659 | 12/62 | Marshall | 62—52 |

SAMUEL LEVINE, *Primary Examiner.*